US008816533B2

(12) United States Patent
Navarro et al.

(10) Patent No.: US 8,816,533 B2
(45) Date of Patent: Aug. 26, 2014

(54) UNINTERRUPTIBLE POWER SUPPLY SYSTEMS AND METHODS USING AN ISOLATED NEUTRAL REFERENCE

(75) Inventors: George Navarro, Raleigh, NC (US); Keith Bauman, Oxford, NC (US)

(73) Assignee: Eaton Corporation, Cleveland, OH (US)

( * ) Notice: Subject to any disclaimer, the term of this patent is extended or adjusted under 35 U.S.C. 154(b) by 662 days.

(21) Appl. No.: 13/098,088

(22) Filed: Apr. 29, 2011

(65) Prior Publication Data
US 2012/0205982 A1 Aug. 16, 2012

Related U.S. Application Data

(60) Provisional application No. 61/443,459, filed on Feb. 16, 2011.

(51) Int. Cl.
*H02J 9/06* (2006.01)
(52) U.S. Cl.
CPC *H02J 9/062* (2013.01); *H02J 9/061* (2013.01)
USPC .......................................................... 307/64
(58) Field of Classification Search
USPC .................................................... 307/64, 66
See application file for complete search history.

(56) References Cited

U.S. PATENT DOCUMENTS

| 5,200,644 | A * | 4/1993 | Kobayashi et al. | 307/66 |
|---|---|---|---|---|
| 5,612,580 | A * | 3/1997 | Janonis et al. | 307/64 |
| 6,160,722 | A * | 12/2000 | Thommes et al. | 363/37 |
| 6,201,720 | B1 | 3/2001 | Tracy et al. | |
| 2004/0084965 | A1* | 5/2004 | Welches et al. | 307/64 |
| 2005/0162137 | A1* | 7/2005 | Tracy et al. | 323/217 |
| 2005/0231039 | A1* | 10/2005 | Hunt | 307/66 |
| 2006/0221523 | A1* | 10/2006 | Colombi et al. | 361/90 |
| 2007/0064363 | A1* | 3/2007 | Nielsen et al. | 361/90 |
| 2007/0210652 | A1* | 9/2007 | Tracy et al. | 307/66 |
| 2008/0130332 | A1* | 6/2008 | Taimela et al. | 363/95 |
| 2008/0239775 | A1* | 10/2008 | Oughton et al. | 363/134 |
| 2008/0304300 | A1* | 12/2008 | Raju et al. | 363/126 |
| 2009/0021082 | A1* | 1/2009 | Loucks et al. | 307/87 |
| 2009/0051344 | A1* | 2/2009 | Lumsden | 323/349 |

(Continued)

OTHER PUBLICATIONS

IEEE Standards 142-1991, IEEE Recommended Practice for Grounding of Industrial and Commercial Power systems 5th Ed., Jun. 22, 1992, IEEE Xplore, sections 1.4 and 1.9.*
International Search Report Corresponding to International Application No. PCT/US2012/023720; Date of Mailing: Jul. 18, 2012; 12 Pages.
Koeppl G. et al., "Concept and practical testing of single pole operated earthing beakers in an urban MV cable network", *Database Inspec*, The Institution of Electrical Engineers, 18$^{th}$ International Conference and Exhibition on Electricity Distribution, Jun. 6-9, 2005, vol. 3.
Eaton 9395 UPS 225-1100kVA; http://powerquality.eaton.com; Product Literature, Oct. 25, 2010; 12 Pages.

*Primary Examiner* — Jared Fureman
*Assistant Examiner* — Carlos Laguerre
(74) *Attorney, Agent, or Firm* — Myers Bigel Sibley & Sajovec, P.A.

(57) ABSTRACT

An uninterruptible power supply (UPS) system includes an AC input configured to be coupled to an AC power source, an AC output configured to be coupled to a load and a power converter circuit coupled to the AC input and the AC output and configured to selectively provide power to the load from the AC power source and an auxiliary power source. The UPS system further includes a control circuit operatively coupled to the power converter circuit and configured to generate at least one galvanically isolated neutral reference from the AC power source and/or from the AC output and to control the power converter circuit responsive to the generated at least one neutral reference. In particular, the control circuit may be configured to generate the neutral reference from a three-wire AC connection.

15 Claims, 15 Drawing Sheets

(56) References Cited

U.S. PATENT DOCUMENTS

| | | | |
|---|---|---|---|
| 2009/0212631 A1* | 8/2009 | Taylor et al. | 307/66 |
| 2009/0302616 A1* | 12/2009 | Peterson | 290/40 B |
| 2009/0315404 A1* | 12/2009 | Cramer et al. | 307/82 |
| 2010/0094472 A1* | 4/2010 | Woytowitz et al. | 700/284 |
| 2010/0201194 A1* | 8/2010 | Masciarelli et al. | 307/66 |
| 2010/0264882 A1* | 10/2010 | Hartular et al. | 320/139 |
| 2011/0278934 A1* | 11/2011 | Ghosh et al. | 307/66 |

* cited by examiner

US 8,816,533 B2

UNINTERRUPTIBLE POWER SUPPLY SYSTEMS AND METHODS USING AN ISOLATED NEUTRAL REFERENCE

RELATED APPLICATION

This application claims benefit of the priority of U.S. Provisional Patent Application Ser. No. 61/443,459 entitled "Transformerless UPS Systems Using An Isolated Neutral Reference Point," filed Feb. 16, 2011, the disclosure of which is incorporated herein by reference in its entirety.

BACKGROUND

The inventive subject matter relates to power distribution systems and methods and, more particularly, to uninterruptible power supply (UPS) systems and methods.

UPS systems are commonly to provide uninterrupted power in critical applications, such as industrial, medical and data processing applications. The UPS systems used in large-scale distributed electronic installations, such as data centers, may be classified as transformer-type and transformerless. A transformer-type UPS typically includes an output inverter that is connected to the critical load by a transformer that provides galvanic isolation between the load and the input to the UPS (e.g., an AC utility source or generator). Transformerless UPS designs omit the output transformer and typically connect the output inverter directly to the load. Potential advantages of transformerless designs include elimination of the bulk, weight and cost associated with the output transformer. An example of a transformerless UPS design is the Eaton 9395 UPS, described in Eaton 9395 UPS 225-1100 kVA (December 2010), available at powerquality.eaton.com.

Transformerless UPS designs may encounter operational problems when used in three-wire installations in which an input source neutral conductor is not provided to the UPS. These problems may include unstable performance, grounding compliance issues and/or system conflict issues in paralleled applications. For a manufacturer of transformerless UPSs, such issues can lead to loss of sales, as the aforementioned problems can lead consultants to refrain from specifying transformerless designs, even though they may offer advantages in cost, weight and space.

One technique to address such issues includes installation of a set of wye-connected inductors at the UPS to provide a neutral reference in three-wire applications. An example of such an approach is illustrated in FIG. 15, which schematically illustrates a neutral reference circuit 5 for use with a transformerless UPS 2, along the lines of a "neutral reference kit" offered by Eaton Corporation for use with its 90 kW 9390 three-phase UPS in three-wire service applications. The neutral reference circuit 5 includes three inductors connected in a star configuration. Respective ones of the inductors are connected to respective phases of a bypass input of the UPS 2, with a central connection point of the inductors being coupled to a neutral point N of the UPS 2. The neutral point N is internally connected to control circuitry 3 of the UPS 2, which uses the neutral point N as an input for monitoring and control operations of the UPS 2.

SUMMARY

In some embodiments of the inventive subject matter, an uninterruptible power supply (UPS) system includes an AC input configured to be coupled to an AC power source, an AC output configured to be coupled to a load and a power converter circuit coupled to the AC input and the AC output and configured to selectively provide power to the load from the AC power source and an auxiliary power source. The UPS system further includes a control circuit operatively coupled to the power converter circuit and configured to generate at least one galvanically isolated neutral reference from the AC power source and/or from the AC output and to control the power converter circuit responsive to the generated at least one neutral reference. In particular, the control circuit may be configured to generate the neutral reference from a three-wire AC connection.

In some embodiments, the power converter circuit may include a solid-state bridge inverter circuit that is configured to be transformerlessly coupled to the load. The solid-state bridge circuit may include three half-bridge circuits, respective ones of which control respective phases of the AC output.

In some embodiments, the control circuit may include a transformer having a primary winding configured to be coupled to the AC power source and a wye-connected secondary winding having a center node configured to provide the neutral reference. The primary winding of the transformer may be coupled to a rectifier input or to a bypass input.

In further embodiments, the control circuit may include a transformer having a primary winding coupled to the AC output and a wye-connected secondary winding having a center node configured to provide the neutral reference.

According to additional embodiments, the control circuit may include an analog-to-digital conversion circuit configured to generate voltage values corresponding to phase-to-phase voltages of the AC source and a computation circuit configured to compute the neutral reference from the generated voltage values.

In some embodiments, a UPS system includes an AC input configured to be coupled to a three-wire AC service and a power conversion circuit comprising a solid-state bridge inverter circuit coupled to the AC input and having an output configured to be transformerlessly coupled to a load. The UPS system further includes a control circuit configured to generate a galvanically isolated neutral reference for the inverter circuit from a phase-to-phase voltage of the AC service. The control circuit may include a reference-generating transformer having a primary winding configured to be coupled to the AC service and a wye-connected secondary winding having a center node configured to provide the neutral reference. Some embodiments of the inventive subject provide a power distribution system including a source transformer having a primary coupled to an AC source and wye-connected secondary with phase conductors coupled to the AC input of such a UPS system. A central node of the source transformer has a low-resistance connection to a local ground, and the central node of the reference-generating transformer has a low-resistance connection to a ground of the UPS system. In some embodiments, the central node of the source transformer has a high resistance connection to a local ground, and the central node of the reference-generating transformer is isolated from a ground of the UPS system.

Additional embodiments provide a UPS system including a plurality of UPSs having AC inputs coupled in common to an AC source. Each of the UPSs includes a power converter circuit coupled to the AC input and having AC output configured to be transformerlessly coupled to a load and a control circuit configured to generate a galvanically isolated neutral reference for the power converter circuit.

DETAILED DESCRIPTION OF EMBODIMENTS

Figure 1:
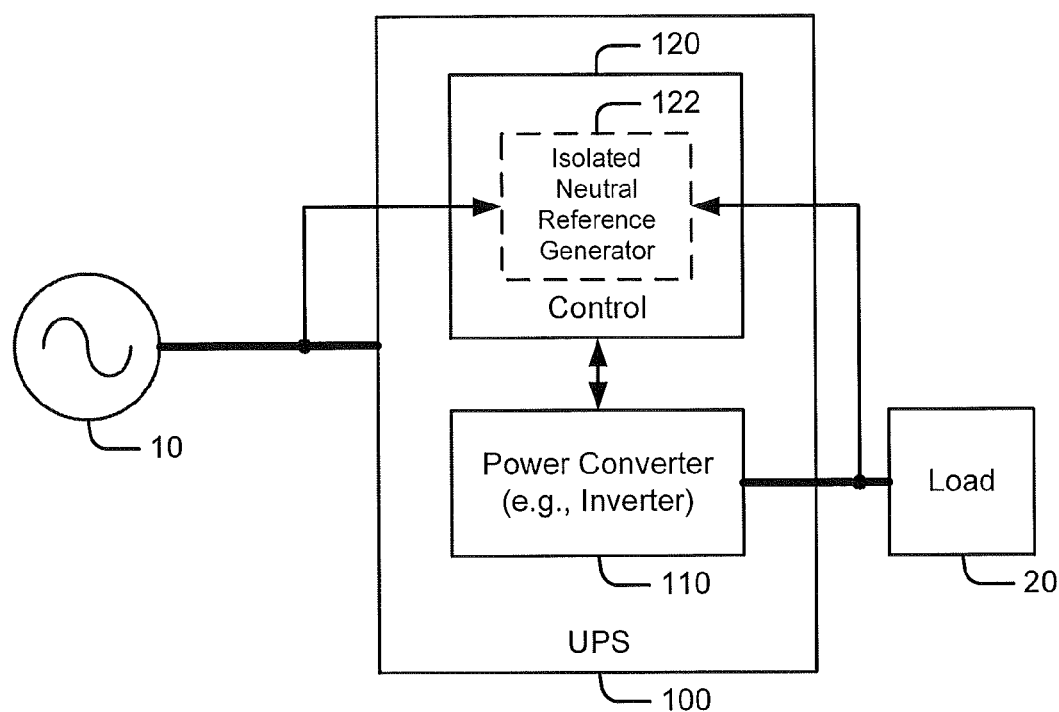
FIG. 1 is a schematic diagram illustrating a UPS system with an isolated neutral reference generator according to some embodiments of the inventive subject matter.

Specific embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the inventive subject matter may be embodied as systems and methods. Some embodiments of the inventive subject matter may include hardware and/or combinations of hardware and software. Some embodiments of the inventive subject matter include circuitry configured to provide functions described herein. It will be appreciated that such circuitry may include analog circuits, digital circuits, and combinations of analog and digital circuits.

Embodiments of the inventive subject matter are described below with reference to diagrams of systems and methods according to various embodiments of the inventive subject matter. It will be understood that each block of the diagrams, and combinations of blocks in the diagrams, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the diagrams.

Some embodiments of the inventive subject matter arise from a realization that problems arising in installations of transformerless UPS systems, such as system conflicts and grounding problems, may be reduced or eliminated by using an isolated neutral reference for UPS control and/or monitoring. In various embodiments, such an isolated neutral reference may be generated using a small-capacity (e.g., "signal") transformer. This allows transformerless UPS systems to offer the advantages of transformerless designs, such as reduced weight, space and cost, in applications, such as three-wire service applications, that are often viewed as better served by traditional transformer-based UPS designs. Such techniques also enable the use of a common UPS control circuitry for 4-wire and 3-wire applications, with the latter being accommodated by referencing such control circuitry using a galvanically isolated neutral reference point to avoid issues such as excessive ground currents. This can provide transformerless UPS designs with significant market advantages over other UPS designs.

FIG. 1 illustrates a UPS system 100 according to some embodiments. The UPS system 100 includes a power converter circuit 110 that is configured to be coupled to an AC power source 10 and to deliver power to a load 20. The power converter circuit 110 may include, for example, an inverter circuit that selectively provides power to the load 20 from the source 10 (e.g., via an intervening rectifier circuit) and from an auxiliary source, such as a battery, fuel cell, flywheel energy storage device and/or photovoltaic generator. The UPS system 100 further includes a control circuit 120 operatively associated with the converter circuit 110. The control circuit 120 may, for example, perform a number of different control and monitoring functions, such as controlling the output voltage provided to the load 20 and/or monitoring various parameters associated with providing power to the load, such as monitoring output current to detect faults or overload conditions.

The control circuit 120 includes an isolated neutral reference generator 122, which provides an isolated neutral reference from the power input to the UPS system 100 and/or from an AC output produced by the power converter circuit 110. This isolated neutral reference may be used, for example, to provide a neutral reference that corresponds to a neutral of the AC source 10, such that, for example, operations of an inverter of the power converter circuit may be referenced to the neutral of the AC source 10 without actually providing a neutral conductor from the AC source to the UPS system 100. In this manner, for example, ground currents produced by the UPS may be reduced. In addition, such a neutral reference may be used, for example, to accurately detect ground faults and other failure conditions. An output-derived neutral reference may be similarly used.

Figure 2:
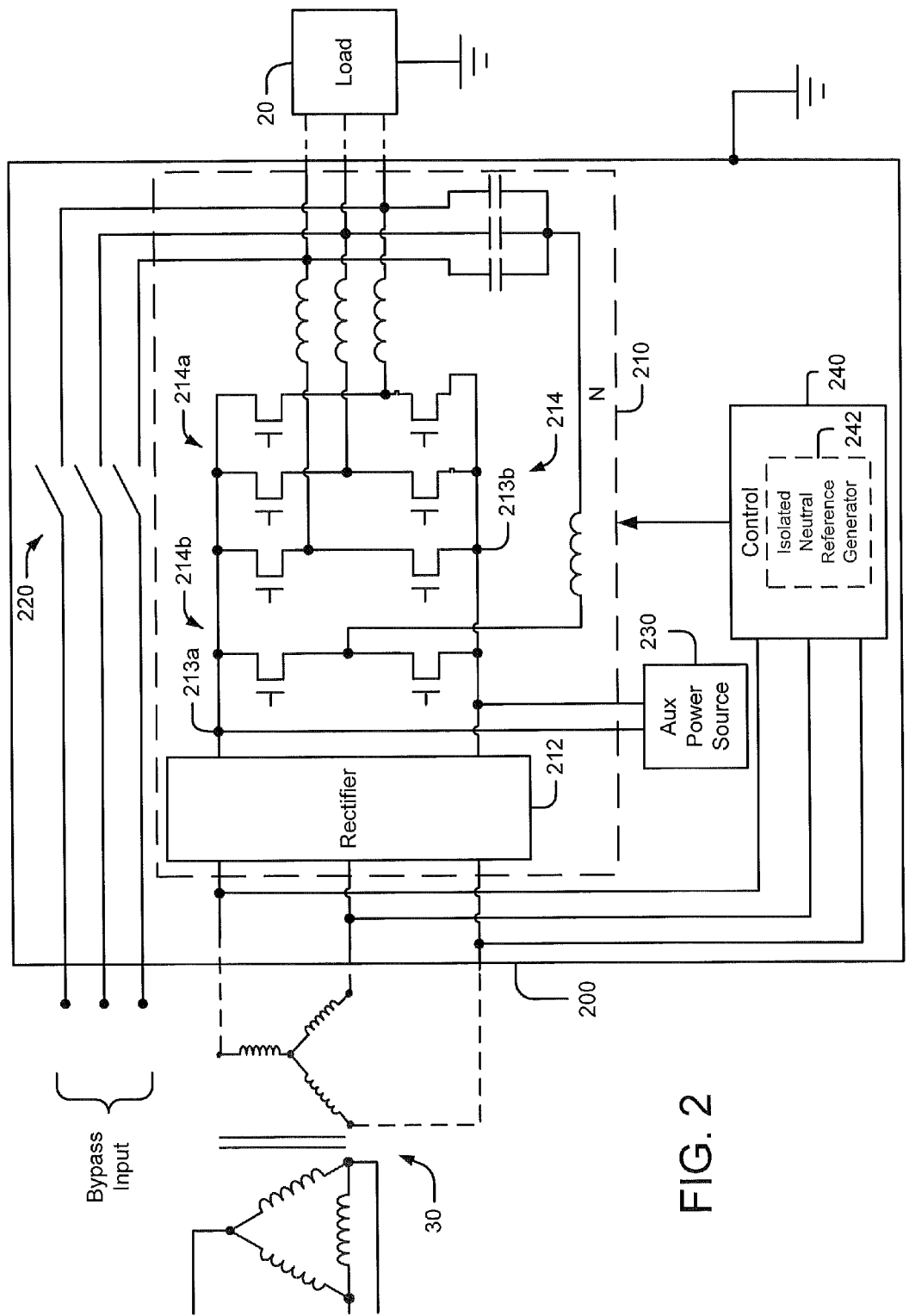
FIG. 2 is a schematic diagram illustrating a transformerless UPS system with an isolated neutral reference according to some embodiments of the inventive subject matter.

FIG. 2 illustrates a UPS system 200 using an isolated neutral reference according to further embodiments. The system 200 includes power converter circuit 210 that is configured to be coupled to a three-wire service provided by a wye-connected secondary winding of a source delta-wye transformer 30. Such a source transformer configuration is commonly used, for example, for three-phase service in industrial and commercial environments in North America. The power converter circuit 210 includes a rectifier circuit 212 and a solid state bridge inverter circuit 214. An input of the rectifier circuit 212 is configured to be coupled to the source transformer 30, and an output of the rectifier circuit 212 is coupled to the solid state bridge inverter circuit 214.

The inverter circuit 214 includes respective half-bridge circuits ("legs") 214a for generating respective phases, along with a neutral coupling half-bridge circuit 214b, which may be used to control an "internal neutral" node N with respect to DC busses 213a, 213b coupling the rectifier circuit 212 and the inverter circuit 214. The phase outputs of the inverter legs 214a are configured to be coupled to a load 20 without an intervening isolation transformer, thus providing what is commonly referred to as a "transformerless" design. The DC busses 213a, 213b may be coupled to an auxiliary power source 230, which may include, for example, a battery, fuel cell or other power source, as well as additional circuitry as may be used to provide voltage conversion and other control functions for delivering power to the busses 213a, 213b from such power sources.

The UPS system 200 also includes a bypass circuit 220 that is configured to bypass the power converter circuit 210. The bypass circuit 220 may be coupled to the source transformer 30 via a different chain of intervening devices (e.g., circuit breakers, switches, etc.) than the input of the rectifier circuit 212. The bypass circuit 220 may be used to bypass the power converter circuit 210 in the case of an internal fault or maintenance and to support a high-efficiency mode of operation in which the power converter circuit 210 may be used, for example, to provide reactive power and/or harmonic compensation.

The UPS system 200 further includes a control circuit 240 that is configured to control operations of the power converter circuit 210. As illustrated, the control circuit 240 includes an isolated neutral reference generator 242 which provides a galvanically isolated neutral reference for operation of the power converter 210 and/or other components of the UPS system 200. As shown, the control circuit 240 derives the isolated neutral reference from an input to the rectifier circuit 212 but, in other embodiments, such a reference may be generated from an input to the bypass circuit 220.

Control functions of the control circuit 240 may use the neutral reference for a variety of functions associated with operation of the power converter circuit 210, the bypass circuit 220 and/or other components of the UPS system 200. For example, the neutral reference may be used as a reference for control of phase voltages produced by the inverter phase legs 214a and/or the neutral leg 124b.

Figure 3:
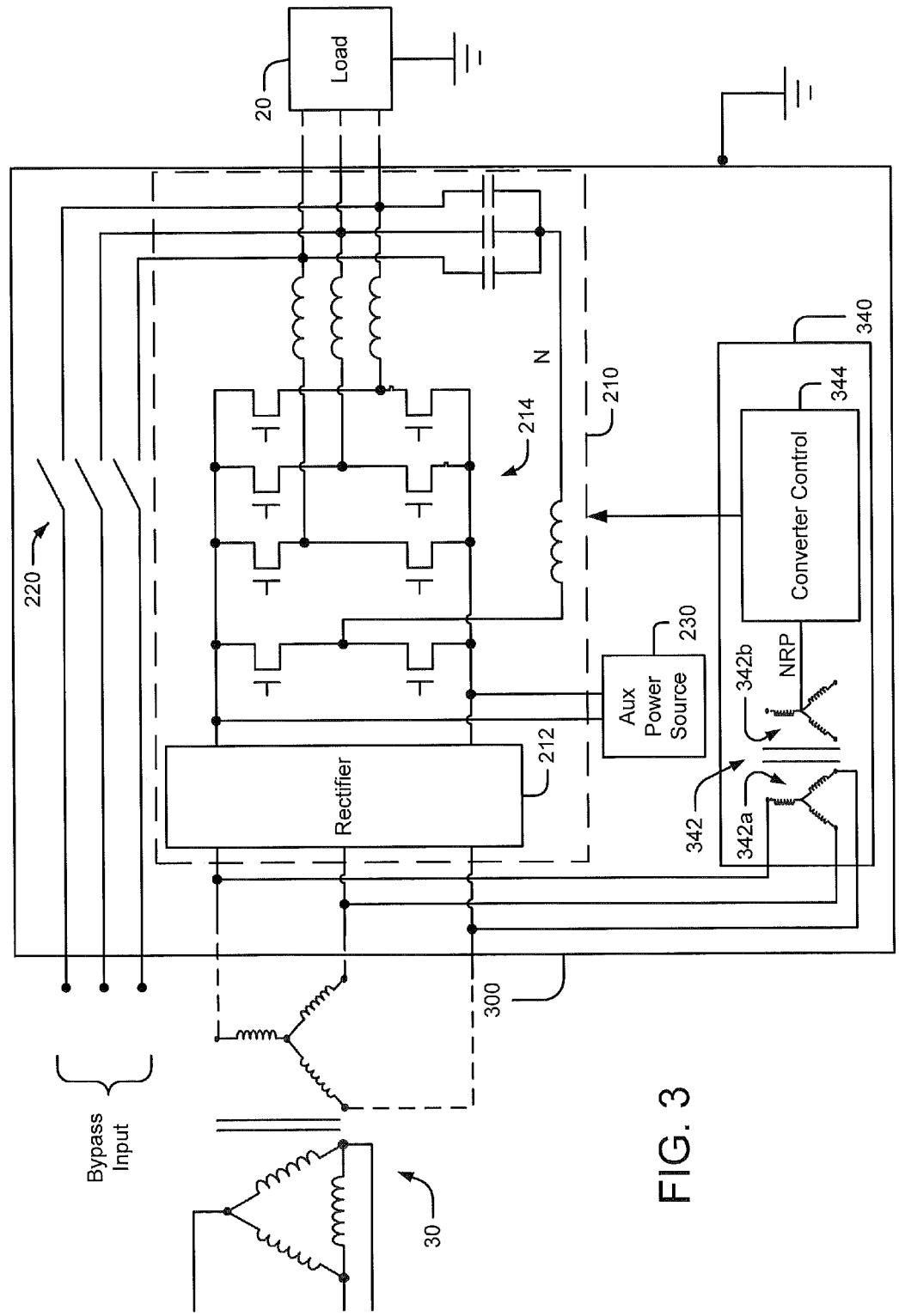
FIG. 3 is a schematic diagram illustrating a transformerless UPS system with a transformer-derived isolated neutral reference according to some embodiments of the inventive subject matter.

FIG. 3 illustrates an example of circuitry for generating such an isolated neutral reference in a UPS system 300 according to some embodiments. Like components of the UPS system 300 and the UPS system 200 of FIG. 2 are indicated by like reference designators and further description will be omitted in light of the foregoing description of FIG. 2. The UPS system 300 includes a control circuit 340 that is configured to control operations of a power converter 210 and other components of the UPS system 300. The control circuit 340 includes an isolated neutral reference generator circuit in the form of a transformer 342 having a primary winding 342a coupled to the input of the rectifier circuit 212 of the power converter circuit 210 and a wye-connected secondary winding 342b having a center tap coupled to a neutral reference point NRP. The transformer 343 generally may be a low-power transformer (e.g., in contrast to the large isolation transformers used in the power trains of transformer-type UPS systems). The neutral reference point NRP is coupled to an input of a control circuit 344, which may control operations of the power converter circuit 210 and other components of the UPS system 300 based on the neutral reference provided at the neutral reference point NRP.

Figure 4:
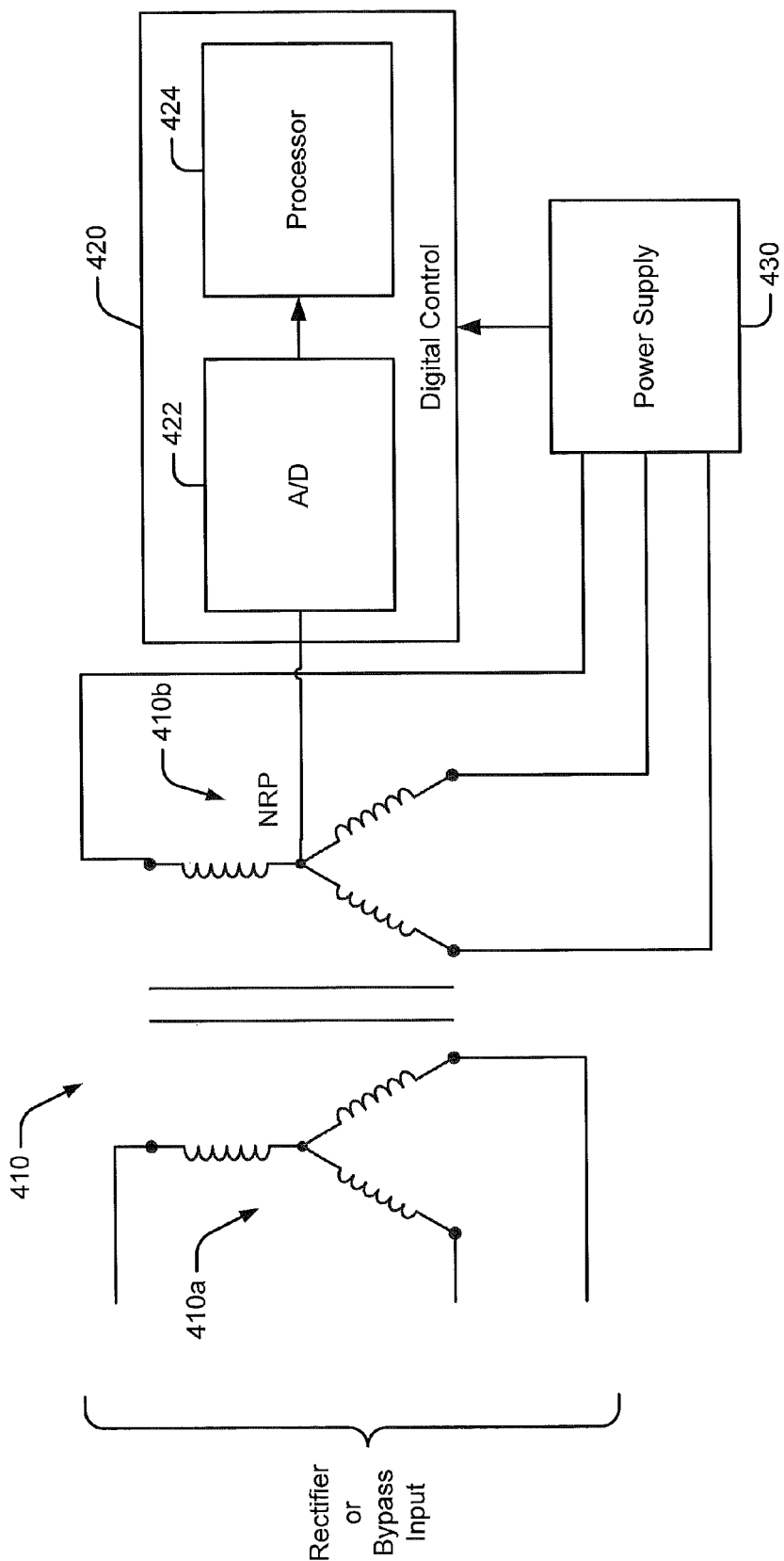
FIG. 4 is a schematic diagram illustrating connection of a transformer-based neutral reference generator according to some embodiments of the inventive subject matter.

For example, as illustrated in FIG. 4, a primary winding 410a of a neutral reference point generating transformer 410 may be coupled to a rectifier or bypass input. A neutral reference point NRP in the form of a center tap of its secondary winding 420b may be coupled to an analog-to-digital (A/D) converter circuit 422 of a digital control circuit 420. The A/D converter circuit 422 may sample a voltage of the neutral reference point NRP, and provide corresponding digital values to a processor 424, which may perform various control and/or monitoring functions based thereon, such as control of an inverter, rectifier or other components of a UPS system. As illustrated, the transformer 410 may be, for example, a transformer that serves other functions, such as providing power to a power supply 430 that provides power to the digital control circuit 420 and/or other components of a UPS system.

Figure 5:
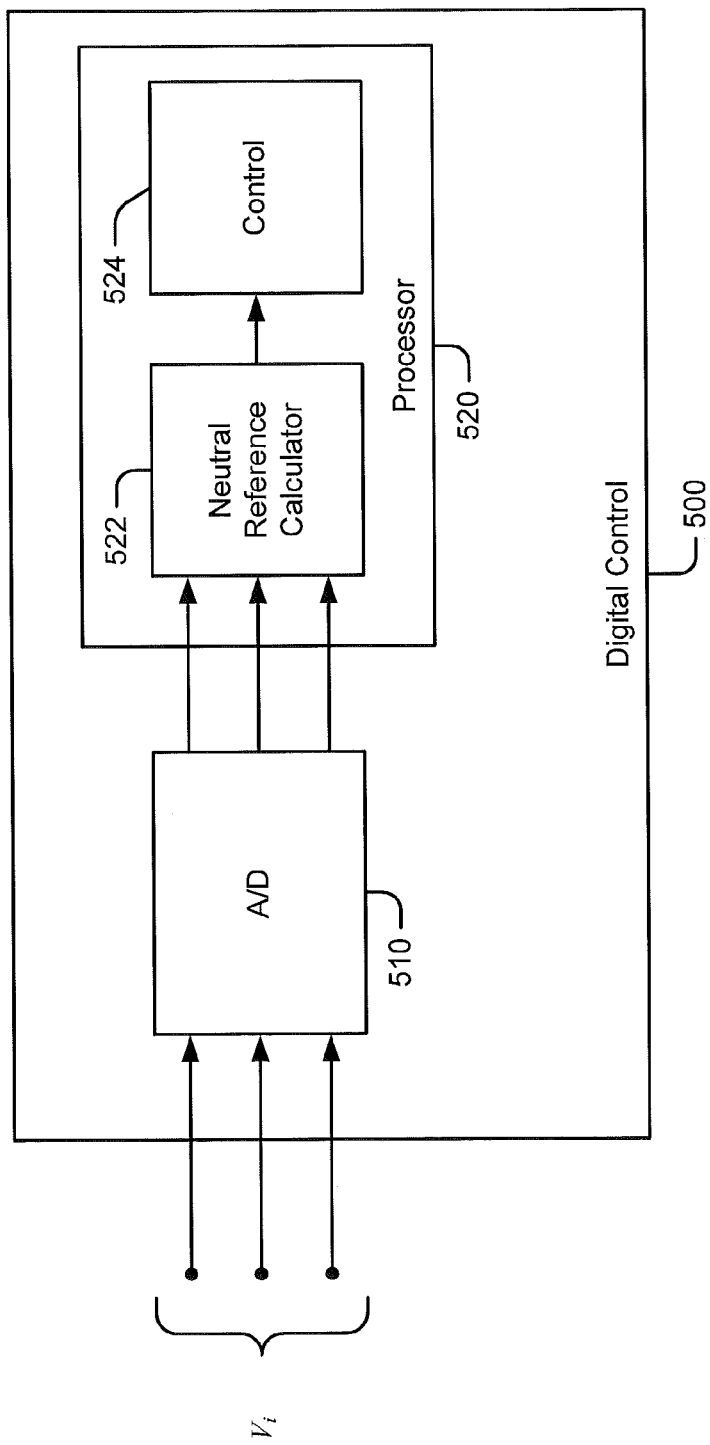
FIG. 5 is a schematic diagram illustrating a digital neutral reference generator according to some embodiments of the inventive subject matter.

FIG. 5 illustrates another technique for generating a neutral reference according to certain embodiments. As illustrated, signals Vi, which may represent, for example, phase-to-phase voltages of a three-phase input to a UPS system, may be provided to a multi-channel A/D converter circuit 510. The A/D converter circuit 510 may responsively generate digital values corresponding to such phase-to-phase voltages. A neutral reference calculator routine 522 executing on a processor 520 may compute neutral reference values from the phase-to-phase voltage values, and provide the neutral reference to one or more control routines 524. The routines 524 may include, for example, routines that implement control algorithms for controlling inverter, rectifier and/or other functions of a UPS system.

Figure 6:
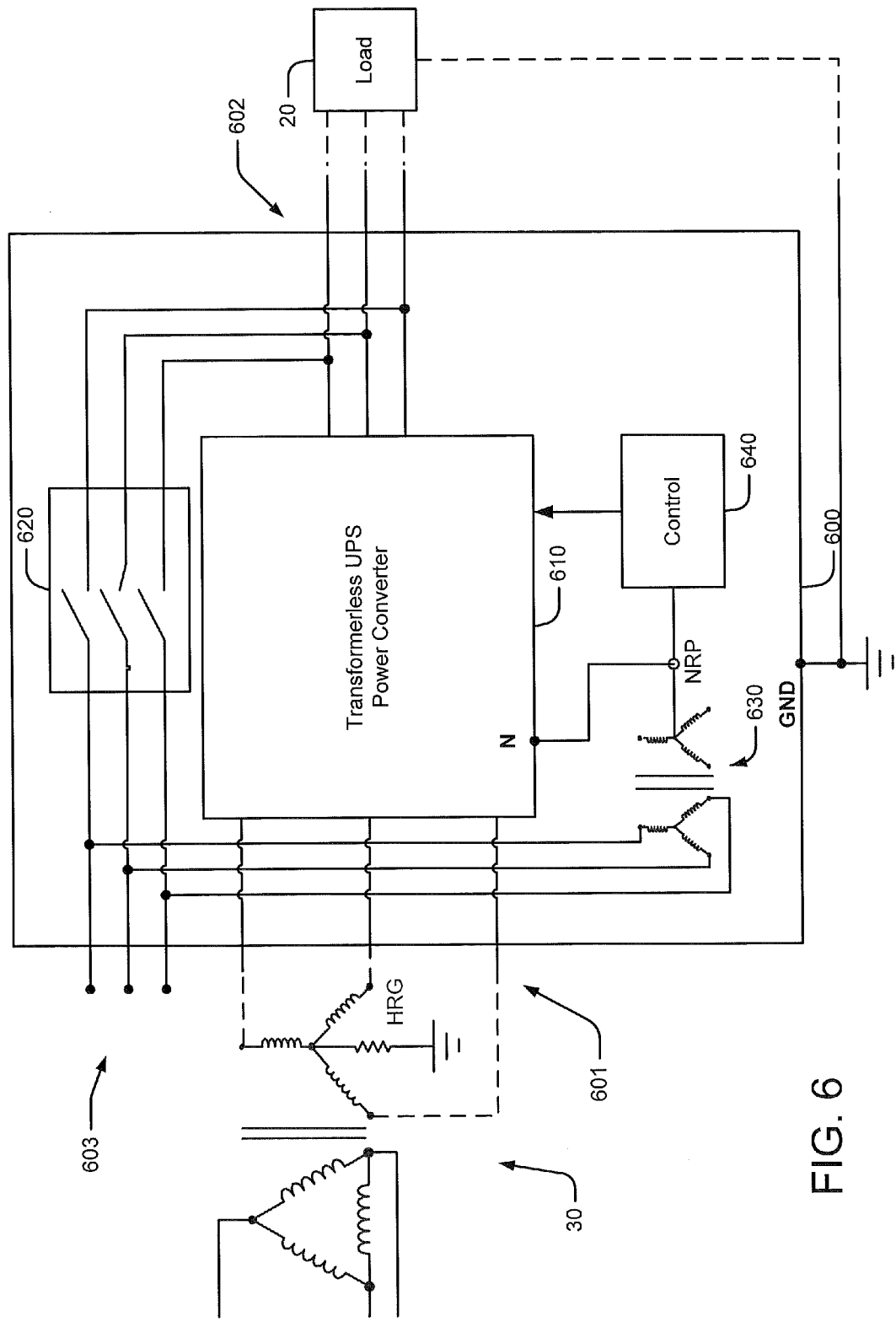
FIGS. 6-8 are schematic diagrams illustrating UPS systems with input-derived neutral references according to some embodiments of the inventive subject matter.

According to various embodiments of the inventive subject matter, an isolated neutral reference in a UPS system may be connected in various different ways for different input source configurations to provide desired grounding and other characteristics. Referring to FIG. 6, a UPS system 600 is coupled to a secondary winding of a source transformer 30 having a high resistance ground (HRG). Such a source configuration may be used, for example, in installations designed to have high availability. In such systems, the HRG can limit ground fault currents such that circuit breakers and other protection devices are less likely to be tripped in the event of a ground fault and, resultantly, take critical loads off-line.

The UPS system 600 includes a transformerless UPS power converter circuit 610 coupled between an AC input 601 and an output 602. The power converter circuit 610 may include, for example, a rectifier/inverter chain along the lines discussed with respect to FIG. 2, selectively providing power to a load 20 at the output 602 from the source transformer 30 and an auxiliary source, such as a battery. The UPS system 600 further includes a bypass circuit 620 having an input 603 that may be coupled to the source transformer 30 via intervening components, such as switches and circuit breakers. The bypass circuit 620 may be used, for example, to bypass the power converter circuit 610 in the event of failure and/or to support certain modes of operation, such as high efficiency modes in which the power converter circuit 610 performs reactive power and/or harmonic compensation.

Figure 7:
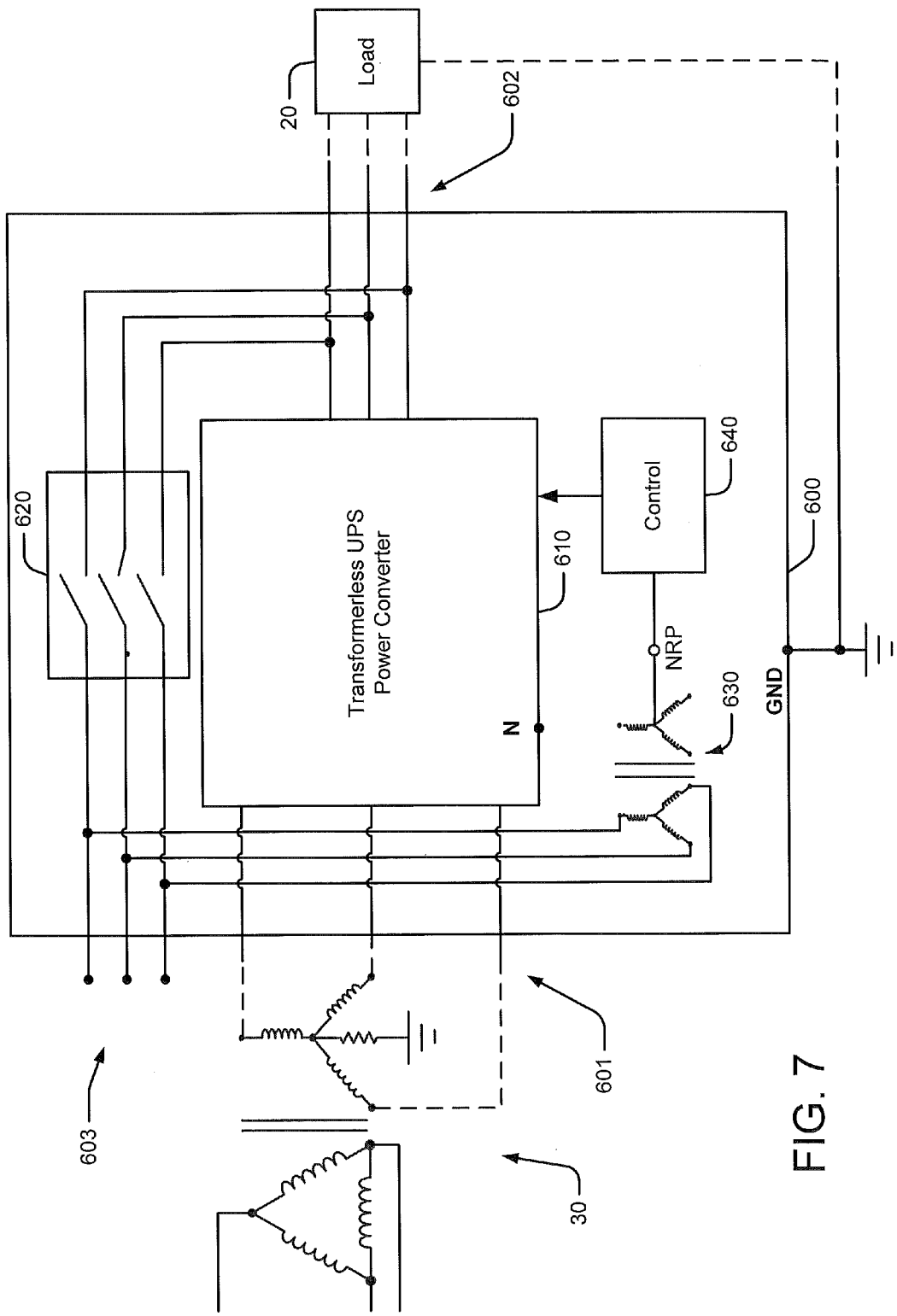

The system 600 further includes a transformer 630 having a primary winding coupled to the bypass input 603 and a wye-connected secondary winding having a central node coupled to a neutral reference point NRP. The neutral reference point NRP is coupled to an input of a control circuit 640, which controls the power converter circuit 610 and other components of the UPS system 600 using the neutral reference point NRP as a neutral reference. In the illustrated configuration, the neutral reference point NRP is also coupled to an internal neutral N of the power converter circuit 610, e.g., a neutral conductor along the lines of the internal neutral N of FIG. 2. In correspondence with the presence of the HRG of the source, the neutral reference point NRP is not coupled to a ground GND of the UPS 600, i.e., a high resistance exists between the neutral reference point NRP and the UPS ground GND. FIG. 7 illustrates an alternative configuration for a HRG application in which a neutral reference point NRP is left disconnected from both the internal neutral N of the power converter circuit 610 and the UPS ground GND.

Figure 8:
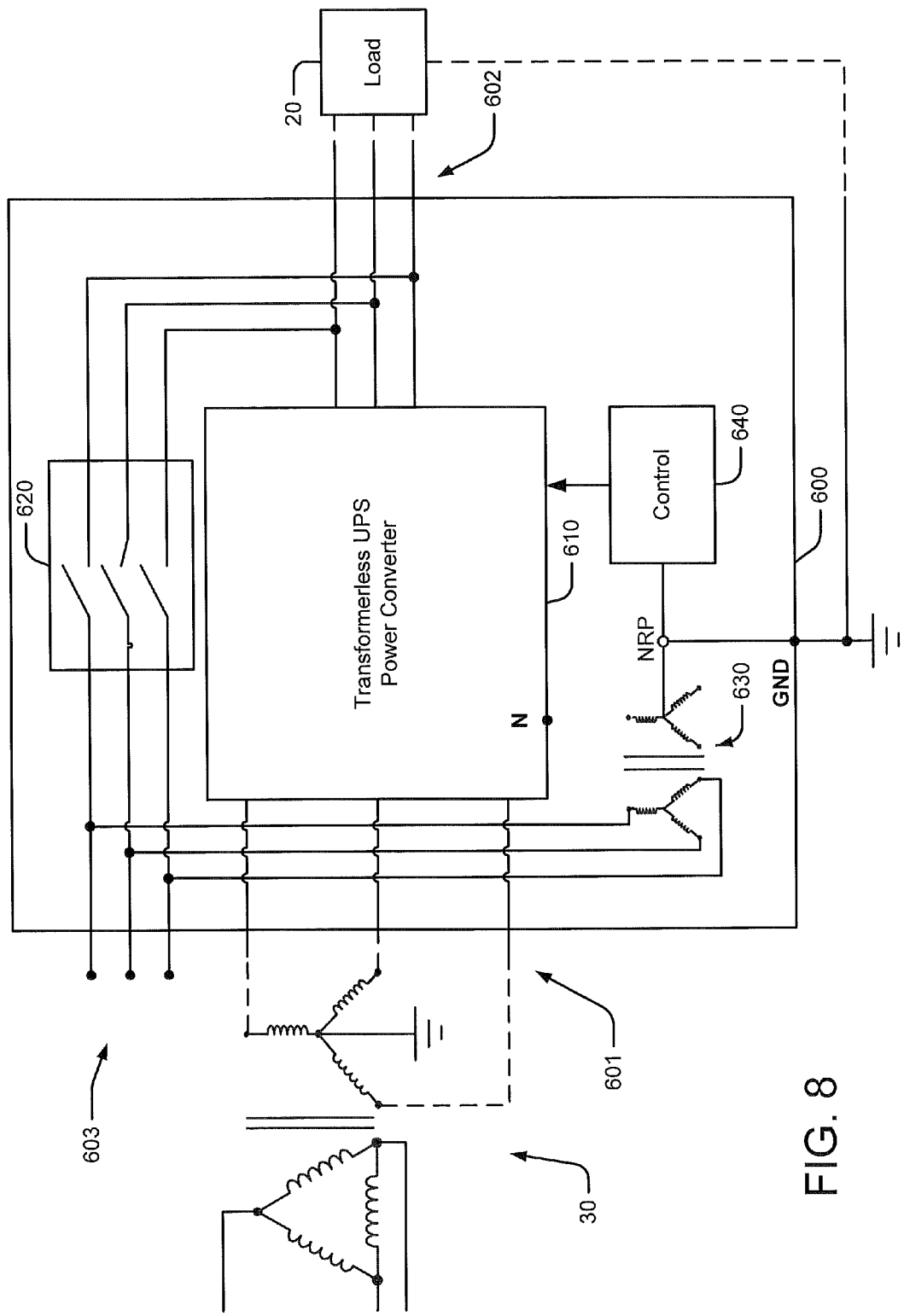

FIG. 8 illustrates a configuration wherein the secondary of the source transformer 30 has a low resistance coupling to a ground. In this case, the neutral reference point NRP of the UPS 600 may be coupled by a low resistance path to the UPS ground GND, mirroring the source ground connection.

Figure 9:
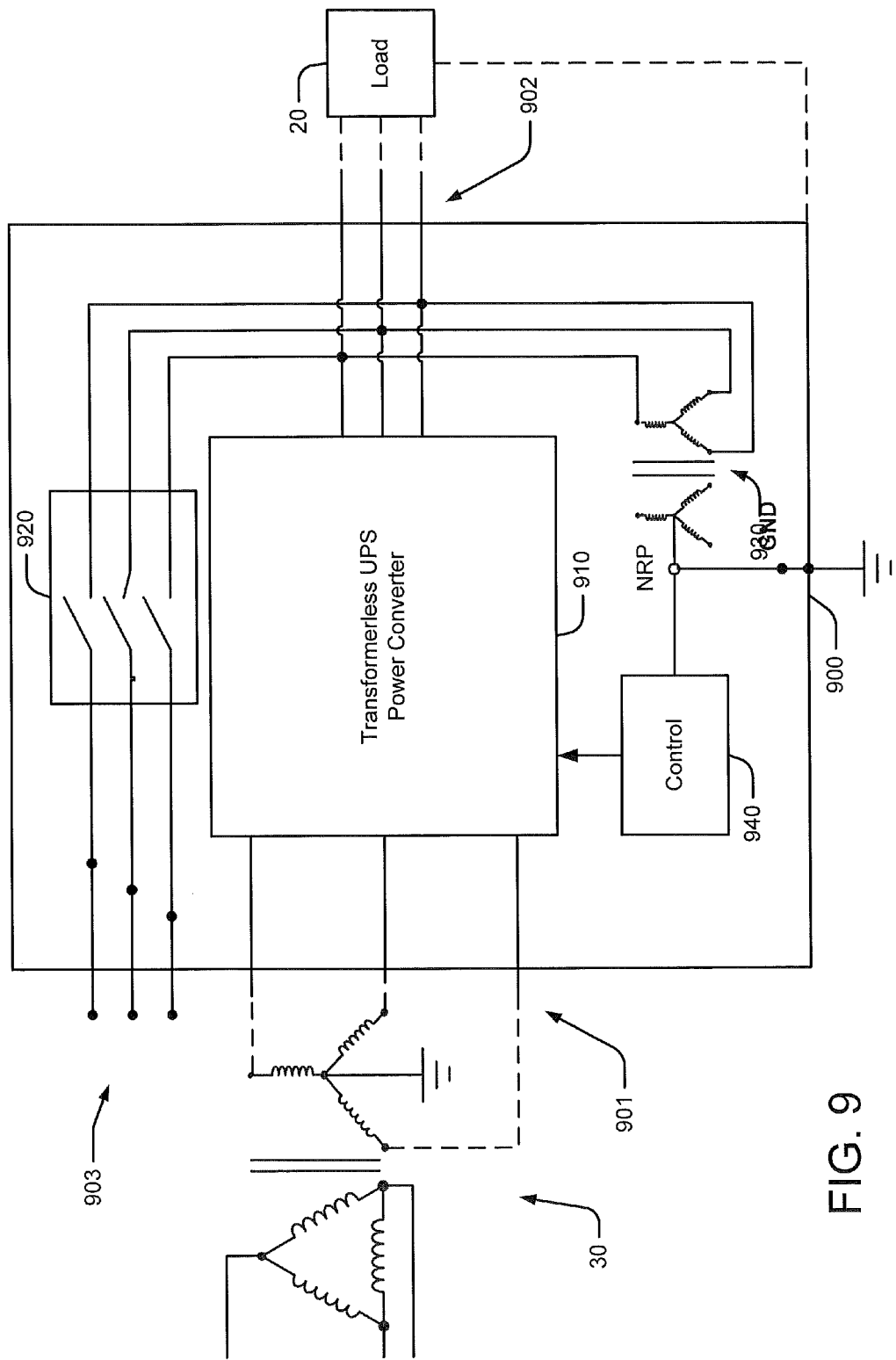
FIGS. 9 and 10 are schematic diagrams illustrating UPS systems with output-derived neutral references according to some embodiments of the inventive subject matter.

According to further embodiments, similar techniques may be used for an isolated neutral reference derived from the output of a UPS. FIG. 9 illustrates a UPS system 900 that includes a transformerless UPS power converter circuit 910 coupled between an AC input 901 and an output 902. The power converter circuit 910 may include a rectifier/inverter chain along the lines discussed with respect to FIG. 2, selectively providing power to a load 20 at the output 902 from the source transformer 30 and an auxiliary source, such as a battery. The UPS system 900 further includes a bypass circuit 920 having a bypass input 903 that is coupled to the source transformer 30 and which may be used to bypass the power converter circuit 910.

A transformer 930 has a primary winding coupled to the output 902 and a wye-connected secondary winding coupled to a neutral reference point NRP. The neutral reference point NRP is coupled to an input of a control circuit 940, which controls the power converter circuit 910 and other components of the UPS system 900, and to a UPS ground GND. This arrangement may, for example, enable a relatively smooth transition from an AC utility source to battery operation, as a neutral reference can be maintained through the loss of a rectifier or bypass input to the UPS system 900. On-battery performance in such an arrangement may approach grounded output characteristics by providing a more clearly-defined three-phase output voltage space with respect to ground. This arrangement may also support a neutral-leg free mode of operation, i.e., may eliminate the need to operate a neutral leg such as the neutral leg 214b of the UPS system 200 of FIG. 2.

Figure 10:
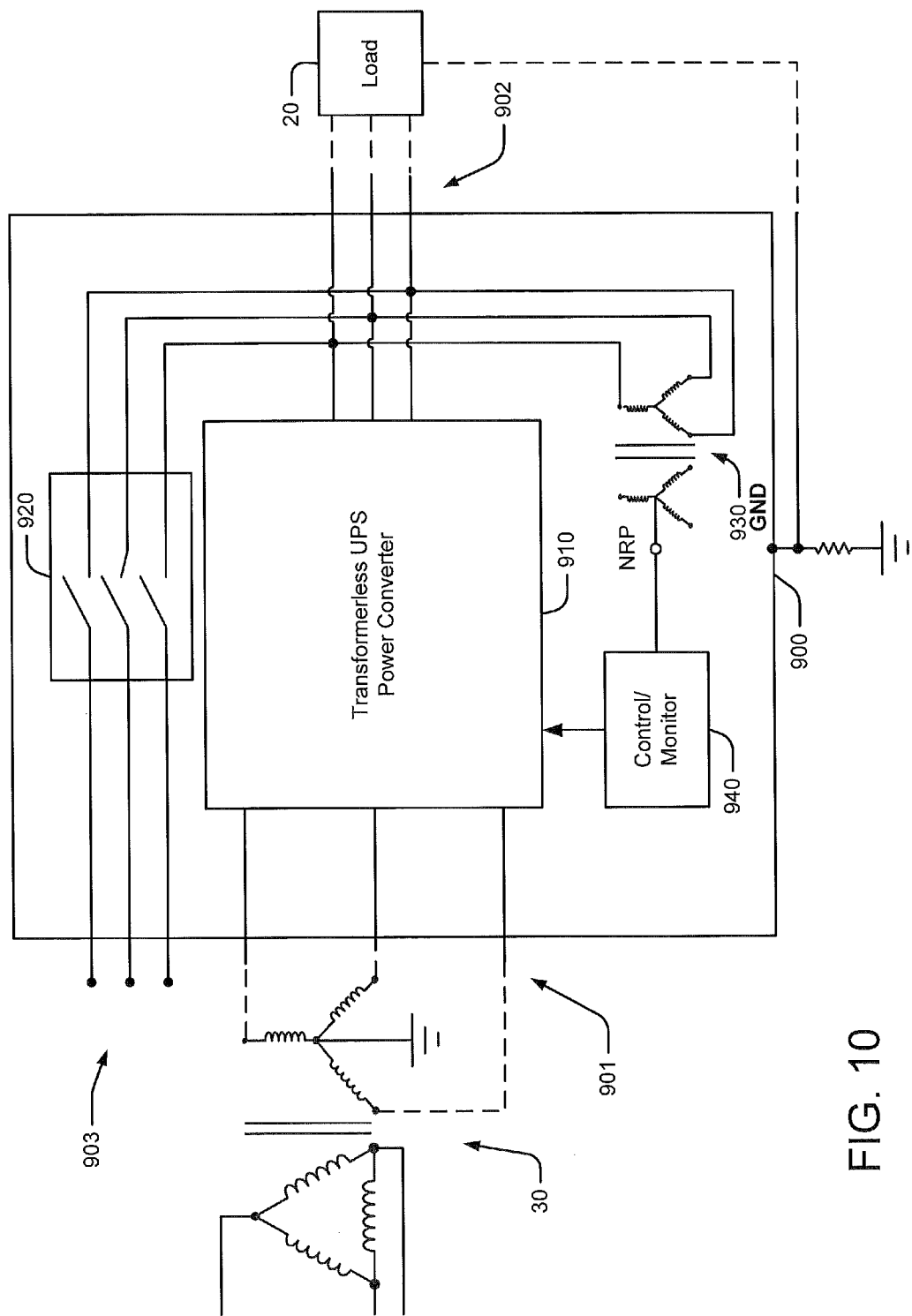

An ungrounded output-derived neutral reference point NRP may be used in other configurations, as illustrated in FIG. 10. This configuration may support smoother transition to battery operation and neutral-free operation as described above. This configuration may also support implementation of a HRG system.

Figure 11:
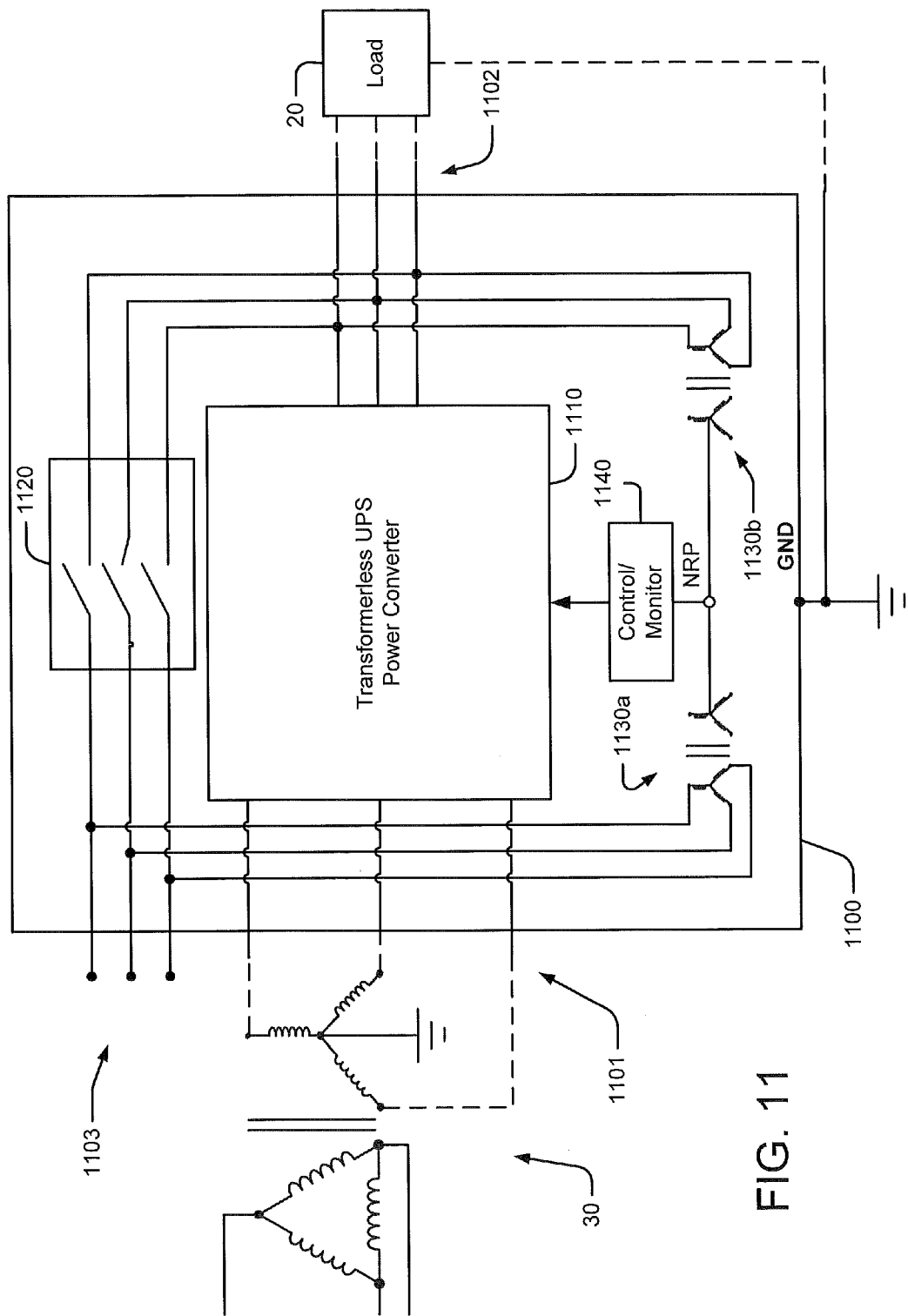
FIGS. 11 and 12 are schematic diagrams illustrating UPS systems with input- and output-derived neutral references according to some embodiments of the inventive subject matter.

According to further embodiments, input- and output-derived isolated neutral references may be used in combination in a UPS system. FIG. 11 illustrates a UPS system 1100 that includes a transformerless UPS power converter circuit 1110 coupled between an AC input 1101 and an output 1102. The power converter circuit 1110 may include a rectifier/inverter chain along the lines discussed with respect to FIG. 2, selectively providing power to a load 20 at the output 1102 from the source transformer 30 and an auxiliary source, such as a battery. The UPS system 1100 further includes a bypass circuit 1120 having a bypass input 1103 that may be coupled to the source transformer 30 and which may be used to bypass the power converter circuit 1110.

Figure 12:
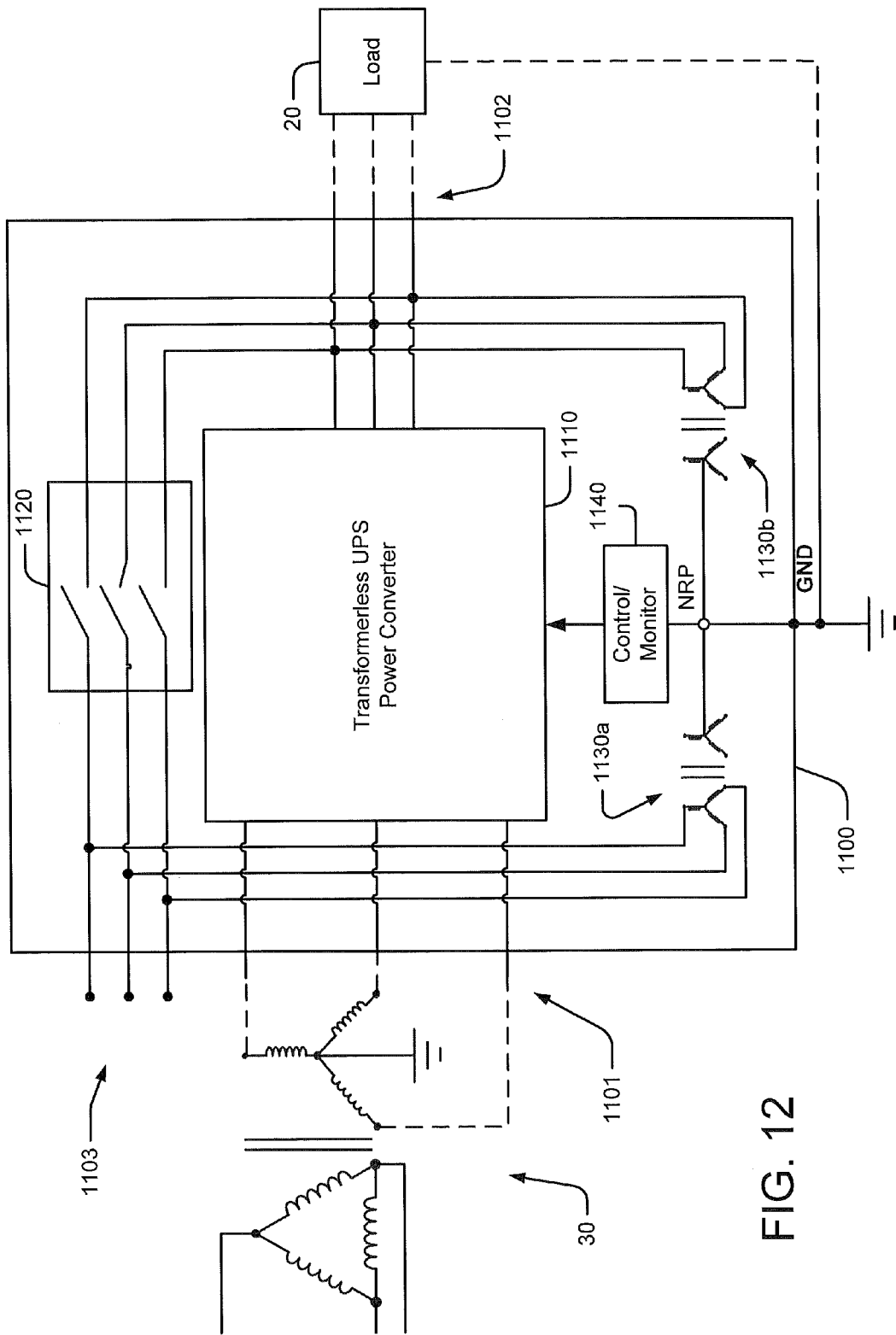

A first transformer 1130a has a primary winding coupled to the bypass input 1103 and a secondary winding having a central node at a neutral reference point NRP. A second transformer 1130b has a primary winding coupled to an output 1102 of the power converter circuit 1110 and a secondary winding having a central node coupled to the neutral reference point NRP. The neutral reference point NRP is coupled to an input of a control circuit 1140, which controls the power converter circuit 1110 and other components of the UPS system 1100, and floats with respect to the UPS ground GND. FIG. 12 illustrates a different arrangement in which the neutral reference point NRP is coupled to the UPS ground GND. The arrangements shown in FIGS. 11 and 12 may, for example, enable operation of the UPS system 1100 with a neutral reference relating to the neutral of the source transformer 30, while supporting smooth transition to battery power using a neutral reference derived from the output. In further embodiments, instead respective input and output derived reference points may be independently provided to a control circuit, such as the control circuit 1140, and used for similar control and/or monitoring functions.

Figure 13:
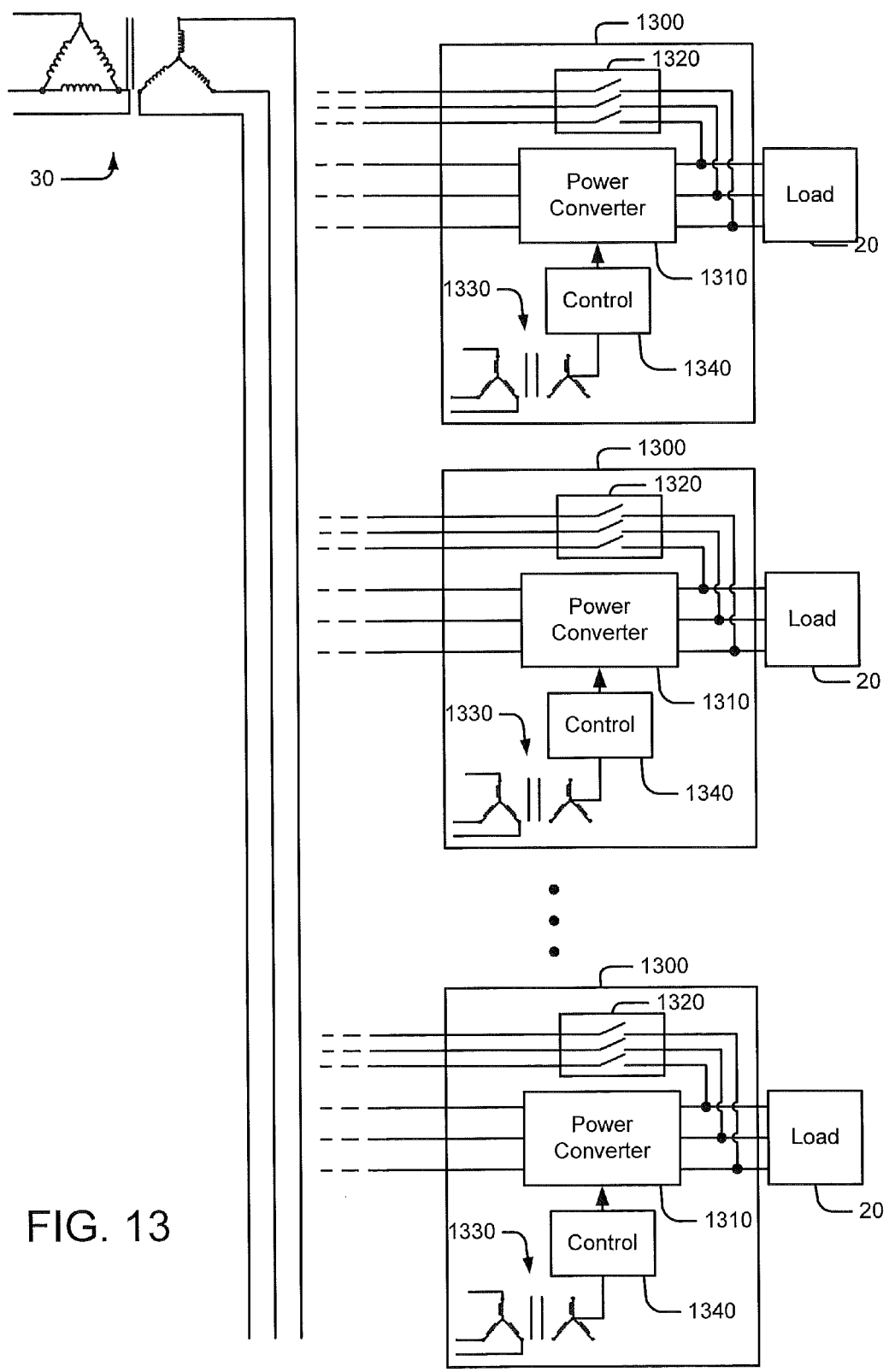
FIG. 13 is a schematic diagram illustrating a UPS system including multiple UPSs with isolated neutral references according to further embodiments of the inventive subject matter.

Isolated neutral reference points along lines discussed above may be used to particular advantage in multi-UPS installations in which a plurality of UPSs are coupled to a common three-wire source. For example, FIG. 13 illustrates a power distribution system including a plurality of UPS systems 1300 coupled to a secondary of a source transformer 30 and serving respective loads 20. Such an arrangement may be used, for example, in a large-scale data center. Each of the UPS systems 1300 includes a power converter 1310 and a bypass 1320. Each UPS system 1300 includes a transformer 1330 that having a wye-connected secondary having a central node coupled to a neutral reference point NRP, providing a neutral reference to a control circuit 1340. The use of the galvanically isolated neutral references for operation of the UPS systems 1300 can reduce the likelihood of system conflicts when, for example, one of the UPS systems 1300 experiences a fault and/or changes a mode of operation. For example, of one of the UPS systems 1300 experiences an output fault, the neutral references of the other UPS systems 1300 may be isolated from ground current induced effects.

This may prevent disturbance of power converter operations and generation of false alerts and other undesirable effects arising from voltage and other measurements that may be distorted by ground currents.

Figure 14:
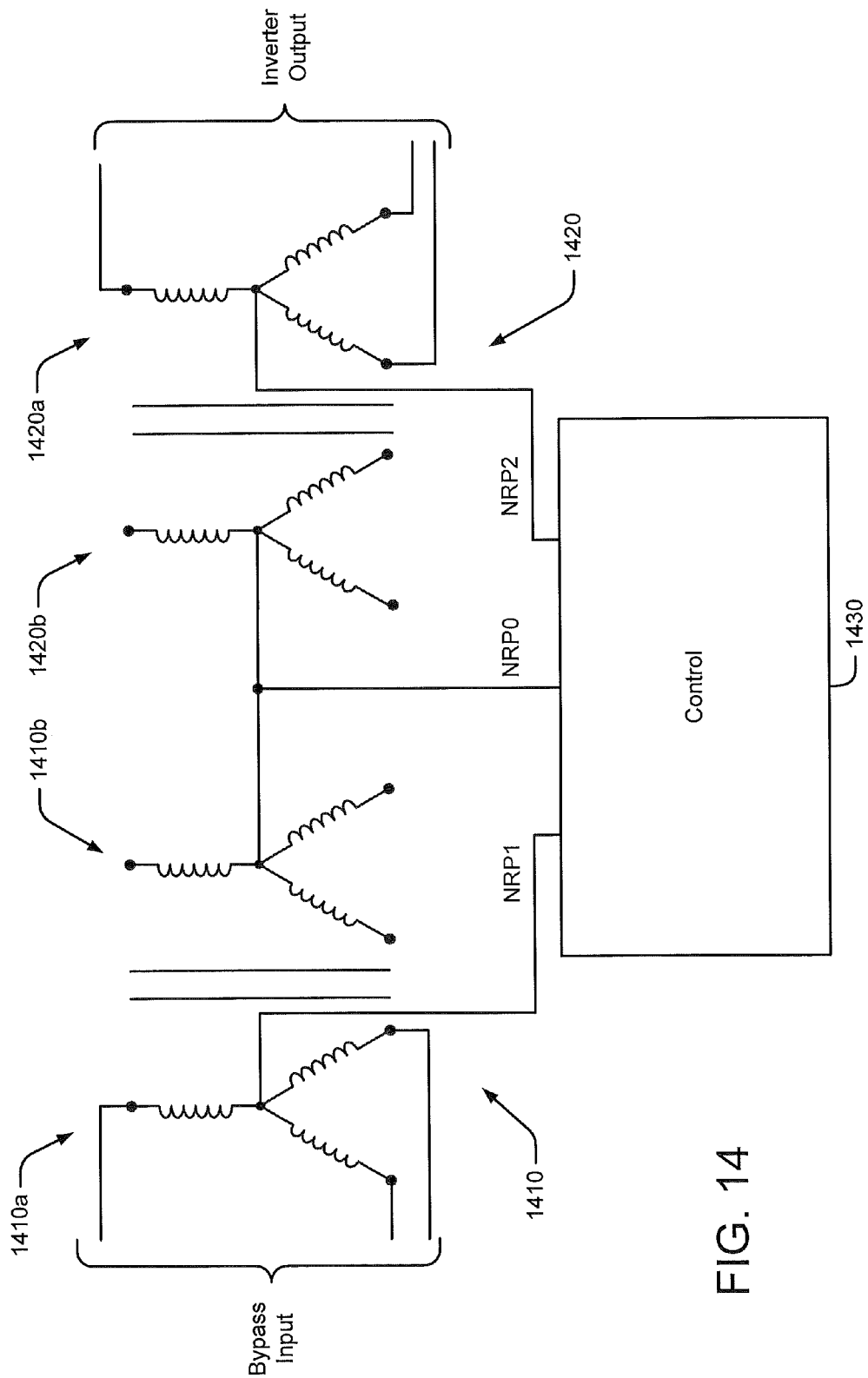
FIG. 14 is a schematic diagram illustrating use of multiple neutral reference points according to further embodiments of the inventive subject matter.
Figure 15:
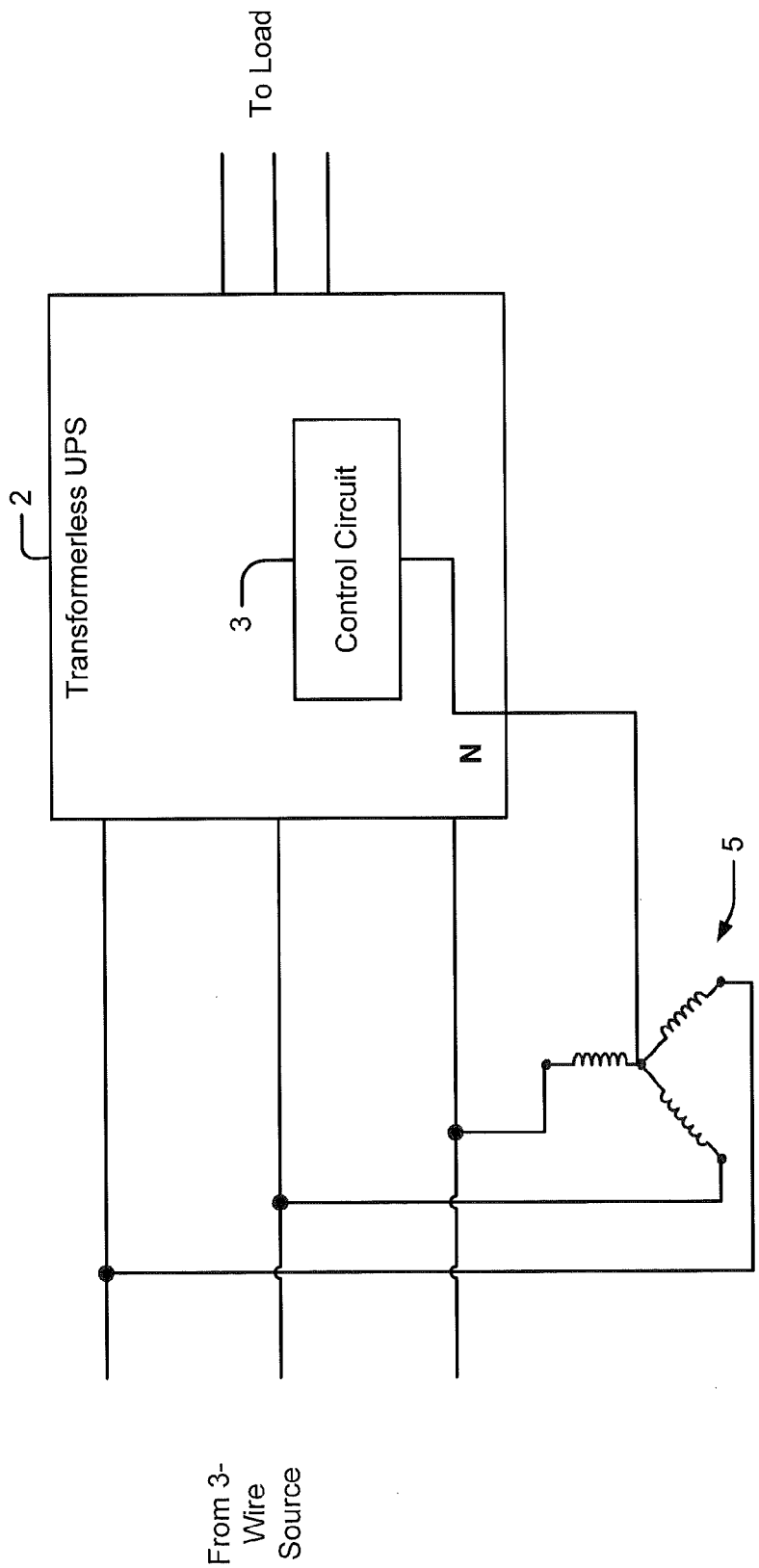
FIG. 15 is a schematic diagram illustrating a neutral reference kit used in conventional UPS systems.

In some embodiments of the inventive subject matter, multiple isolated and non-isolated neutral reference points may be provided to a power converter apparatus, such as a UPS, and may be used for various control and/or monitoring functions. For example, as illustrated in FIG. 14, a first signal transformer 1410 may have a primary winding 1410a coupled to a bypass input of a UPS. A second signal transformer 1420 may have a primary winding 1420a coupled to an inverter output of the UPS. Center points of secondary windings 1410b, 1420b of the first and second transformers 1410, 1420 may be connected in common to provide a first isolated neutral reference point NRP0 for a control circuit 1430 of the UPS. Respective center points of the primary windings 1410a, 1420b may provide respective additional non-isolated neutral reference points NRP1, NRP2 to the control circuit 1430. The non-isolated neutral reference points NRP1, NRP2 may be used, for example, to monitor the status of the bypass source and/or the load such that, for example, phase-to-ground faults may be detected. These inputs may be used, for example, to trigger alarms and/or to enable corrections to parameter measurements that may be distorted by such faults. Such capabilities may improve reliability and availability of the UPS.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An uninterruptible power supply (UPS) system comprising:
   an AC input configured to be coupled to an AC power source;
   an AC output configured to be coupled to a load;
   a power converter circuit coupled to the AC input and the AC output and configured to selectively provide power to the load from the AC power source and an auxiliary power source;
   a control circuit operatively coupled to the power converter circuit and configured to generate at least one galvanically isolated neutral reference from the AC power source and/or from the AC output and to control the power converter circuit responsive to the generated at least one galvanically isolated neutral reference; and
   wherein the control circuit comprises a transformer having a primary winding configured to be coupled to the AC power source and a wye-connected secondary winding having a center node configured to provide the generated at least one galvanically isolated neutral reference.

2. The UPS system of claim 1, wherein the control circuit is configured to generate the neutral reference from a three-wire AC connection.

3. The UPS system of claim 1, wherein the power converter circuit comprises a solid-state bridge inverter circuit that is configured to be transformerlessly coupled to the load.

4. The UPS system of claim 3, wherein the solid-state bridge circuit comprises three half-bridge circuits, respective ones of which control respective phases of the AC output.

5. The UPS system of claim 1, wherein the primary winding of the transformer is coupled to a rectifier input or to a bypass input.

6. The UPS system of claim 1, wherein the control circuit comprises a transformer having a primary winding coupled to the AC output and a wye-connected secondary winding having a center node configured to provide the generated at least one galvanically isolated neutral reference.

7. A UPS system comprising:
   an AC input configured to be coupled to a three-wire AC service;
   a power conversion circuit comprising an solid-state bridge inverter circuit coupled to the AC input and having an output configured to be transformerlessly coupled to a load;
   a control circuit configured to generate a galvanically isolated neutral reference for the inverter circuit from a phase-to-phase voltage of the three-wire AC service; and
   wherein the control circuit comprises a reference-generating transformer having a primary winding configured to be coupled to the AC service and a wye-connected secondary winding having a center node configured to provide the generated at least one galvanically isolated neutral reference.

8. The UPS system of claim 7, wherein the power conversion circuit comprises a rectifier circuit and wherein the primary winding of the reference-generating transformer is coupled to an input of the rectifier circuit.

9. The UPS system of claim 7, further comprising a bypass circuit configured to bypass the inverter circuit and wherein the primary winding of the reference-generating transformer is coupled to an input to the bypass circuit.

10. A power distribution system comprising a source transformer having a primary coupled to an AC source and wye-connected secondary with phase conductors coupled to the AC input of the UPS system of claim 7 and a central node having a low-resistance connection to a local ground, and wherein the central node of the reference-generating transformer has a low-resistance connection to a ground of the UPS system.

11. A power distribution system comprising a source transformer having a primary coupled to an AC source and a wye-connected secondary with phase conductors coupled to the AC input of the UPS system of claim 7 and a central node having a high resistance connection to a local ground, wherein the central node of the reference-generating transformer is isolated from a ground of the UPS system.

12. A UPS system comprising:
   a plurality of UPSs having AC inputs coupled in common to an AC source, each of the UPSs comprising a power converter circuit coupled to the AC input and having AC output configured to be transformerlessly coupled to a load and a control circuit configured to generate a galvanically isolated neutral reference for the power converter circuit; and
   wherein each of the control circuits comprises a reference-generating transformer having a primary winding coupled to phase conductors of the AC input and a wye-connected secondary winding having a center node configured to provide the generated galvanically isolated neutral reference.

13. The UPS system of claim 12, wherein the power converter circuit comprises an inverter circuit comprising respective half-bridge circuits that control respective phases of the AC output.

14. The UPS system of claim 12, wherein each of the power converter circuits comprises a rectifier circuit coupled to an input of the inverter circuit and wherein the primary winding of the reference-generating transformer is coupled to an input of the rectifier circuit.

15. The UPS system of claim 12, wherein each UPS comprises a bypass circuit configured to bypass the power converter circuit and wherein the primary winding of the reference-generating transformer is coupled to an input of the bypass circuit.

* * * * *